United States Patent [19]

Wagner, Jr. et al.

[11] Patent Number: 4,613,547

[45] Date of Patent: Sep. 23, 1986

[54] MULTI-LAYER ORIENTED POLYPROPYLENE FILMS

[75] Inventors: John R. Wagner, Jr., Rochester; Melvil B. Clauson, Newark, both of N.Y.

[73] Assignee: Mobil Oil Corporation, New York, N.Y.

[21] Appl. No.: 683,782

[22] Filed: Dec. 19, 1984

[51] Int. Cl.$^4$ ............................................. B32B 27/00
[52] U.S. Cl. ..................................... 428/349; 428/35; 428/516; 428/500; 428/910; 156/244.11; 156/244.24; 264/176.1
[58] Field of Search ................ 428/35, 500, 516, 349, 428/910; 156/244.11, 244.24; 264/176 R

[56] References Cited

U.S. PATENT DOCUMENTS

| | | | |
|---|---|---|---|
| 4,205,021 | 5/1980 | Morita et al. | 525/240 |
| 4,297,415 | 10/1981 | Ward et al. | 428/349 |
| 4,340,640 | 7/1982 | Weiner | 428/349 |

FOREIGN PATENT DOCUMENTS 2606  6/1979  European Pat. Off. .

*Primary Examiner*—Edith Buffalow
*Attorney, Agent, or Firm*—A. J. McKillop; M. G. Gilman; J. P. O'Sullivan, Sr.

[57] ABSTRACT

An oriented film structure comprising a polypropylene film having on at least one surface thereof a layer of a blend of (I) a linear low density copolymer of ethylene with a minor proportion of a $C_3$–$C_{10}$ alpha olefin and (II) polypropylene.

9 Claims, No Drawings

MULTI-LAYER ORIENTED POLYPROPYLENE FILMS

BACKGROUND OF THE INVENTION

The invention relates to a multi-layer polypropylene film structure having comparatively low film to film coefficient of friction and superior heat seal characteristics.

Highly crystalline polypropylene film is an excellent packaging material, but it has a high film to film coefficient of friction which makes it difficult or impossible for it to be successfully utilized in automatic packaging equipment. The film will not respond to the packaging speed capability of the system and, as a consequence, jamming results. This material in film form also has a tendency to stick at heat seal surfaces, such as, in packages requiring hot crimp seals. Thus, it is impossible to employ this material in standard commercially available horizontal or vertical form and fill packaging systems without first modifying the polypropylene film so that it can be handled at practicle packaging speeds.

In the past, the coefficient of friction characteristics of polypropylene and other thermoplastic films have been benefically modified by the inclusion in the polymer of coefficient of friction (COF) additives such as, for example, fatty acid amides. The effectiveness of an amide depends upon its ability to migrate to the surface of the films in order to reduce COF. While such amides do improve the COF of the films, the value of the COF is subject to wide variation depending upon the heat history which the film experiences during storage, shipping, and certain converting processes. The presence of such amides on the film surfaces can adversely affect the film's appearance as manifested by an increase in haze, a decrease in gloss and the presence of streaks. The presence of such amides on the surface can also adversely affect the wettability and adhesion of solvent and water base inks, coatings and adhesives.

It is an object of the present invention to provide a multilayer polypropylene film having a comparatively low coefficient of friction, as compared with the unmodified film, without the use of prior art COF additives or anti-block agents.

It is yet another object of the present invention to provide a film having improved COF characteristics which are stable with regard to the heat history of the film.

It is a further object of the present invention to provide a film having improved COF characteristics without the adverse affects on appearance, wetting and adhesion typically experienced with additive-modified films.

SUMMARY OF THE INVENTION

It has been discovered that fatty acid amide and other COF type improvers can be excluded from the contemplated film structures of the present invention.

According to the present invention, there is provided an oriented film structure comprising polypropylene film having on at least one surface thereof a layer of a blend of (I) a linear low density copolymer of ethylene with a minor proportion of a $C_3$–$C_{10}$ alpha olefin ((LLDPE) and (II) polypropylene.

The present invention also is directed to a process for preparing the oriented film structure comprising: applying to at least one surface of a polypropylene film, a layer of a blend of (I) a linear low density copolymer of ethylene with a minor proportion of a $C_3$–$C_{10}$ alpha olefin and (II) polypropylene, bringing the combination to a stretch-orientable condition and stretching it in at least one direction. It is preferred that the blend layer is applied to the polypropylene film during coextrusion through a die followed by cooling prior to biaxial orientation.

DETAILED DESCRIPTION OF THE INVENTION

The present invention is broadly directed to the presentation of an improved surface material on a core layer which is highly crystalline or highly stereoregular polypropylene in oriented film form. The preferred polypropylenes of the core layer are well known in the art and are formed by polymerizing polypropylene in the presence of stereospecific catalyst systems. These polypropylenes can have a melt flow rate at 446° F. ranging from about 1 to about 25, preferably 2 to 8. The crystalline melting point of these materials is about 321°–336° F. The number average molecular weight ranges from about 25,000 to about 100,000. The density ranges from about 0.90–0.91.

The comparatively low COF surface layer applied to the core or substrate polypropylene layer is formed from a blend of polypropylene and a linear low density copolymer of ethylene and a $C_3$–$C_{10}$ alpha olefin. The $C_3$–$C_{10}$ alpha olefin is present in the copolymer in a minor amount. Included among the $C_3$–$C_{10}$ olefinic hydrocarbons are propylene, 1-butene, 4-methyl-1-pentene, 1-hexene, 1-octene, 1-decene, etc. Mixtures of such olefinic hydrocarbon monomers also can be employed. These linear low density copolymers are commercially available materials and are manufactured by low pressure processes employing stereospecific catalysts. These materials usually contain from 2–8 wt. %, preferably 2.5–5 wt. %, of the $C_3$–$C_{10}$ alpha olefin hydrocarbon copolymerized with the ethylene, in sufficient amount to give from 5–15 branches per 1,000 carbon atoms in the linear polymer. Manufacturing processes for linear low density polyethylenes of this type are disclosed in U.S. Pat. Nos. 4,076,698 and 4,205,021, the disclosures of which are incorporated herein in their entirety by reference.

The exterior skin layers are fabricated from a physical blend of one of the above-identified linear low density polyethylene copolymers and polypropylene. The polypropylene employed can be identical to the polypropylene employed for the core layer. The two materials can be blended in a percent by weight of from about 2% by weight to about 90% by weight of the linear low density copolymer with the remainder being the polypropylene. The physical blend can be accomplished by any means which will form a uniform blend of the two components. The components can be premixed as solid dry granules and later melt blended for subsequent extrusion as skin layers on the core material. Alternatively, the material may be melt blended first, cooled and subdivided, and thus, be ready for use as a preformed material.

In the following examples, the polypropylene employed as the core material and also as the material blended with the linear low density copolymer is identified as an isotactic polypropylene, i.e., ARCO W472 available from ARCO Corp. Its melt flow range is 4–5 and it contains no slip or antiblock additives. The linear low density copolymer employed in the examples is a copolymer of ethylene and 1-octene (LLDPE-C$_8$) The 1-octene is present in the copolymer in approximately 2 to 6 wt. %. A suitable material is Dowlex 2047, available from Dow Chemical, Midland, Michigan. It has a melt index of 2.3, a density of 0.917 and contains no slip or antiblock additives.

The films formed in the following examples, as representative of the present invention, have a core of polypropylene and skin layers on both sides thereof. It is understood, however, that structures with but a single skin of the subject blend may also be formed.

EXAMPLE

Polypropylene homopolymer, ARCO W472, as hereinabove defined, was fed into the feed hopper of a conventional rotating screw extruder. The extruder employed had a 2.5 inch diameter and a length to diameter ratio of about 24:1. A satellite extruder was employed for the coextrusion of the hereinabove defined Dowlex 2047, linear low density copolymer of ethylene and 1-octene blended with above-identified polypropylene. The satellite extruder comprises a conventional extruder having an extruder screw with a 1.5 inch diameter and a length to diameter ratio of about 20:1. Molten blended resin from the satellite extruder consisted of 4% by weight of the linear low density copolymer of ethylene and 1-octene and 96 wt. % of the polypropylene. The molten blend was fed into the cast film die affixed to the end of the core extruder through an adapter specifically designed to join the polymer stream from the satellite extruder to the molten polymer core stream so that it covered and encompassed the molten surface of the core layer. The coextruded multi-layer structure was extruded through a slot onto a chill roll, to form a cast film of approximately 35 mils thick and 8 inches wide. This molten laminate, after extrusion was immediately quenched in a cold water bath and sequentially biaxially oriented on conventional equipment. During this process the quenched film was first reheated to approximately 290° F. and stretched in the machine direction employing differential speed rollers. The machine direction stretch was 5 times. This machine direction stretched material was then fed to the transverse orienter where it was heated to about 310° F. and stretched transversely to 8 times its original width. The now biaxially oriented film was cooled, trimmed and wound into a roll. The film had excellent optical clarity and was approximately 0.85 mils in thickness. The skin layers each amounted to about 15% of the overall film thickness.

This procedure was repeated employing the skin layer blends shown in the following Table. The same polypropylene and LLDPE-C$_8$ was employed. For purposes of comparison, data regarding films of 100% polypropylene and another with 100% linear low density copolymer of ethylene and octene-1, LLDPE-C$_8$, are shown in the Table.

The skin/skin coefficient of friction data was obtained in the following manner. The coefficient of friction values referred to herein have been determined according to the procedure of ASTM D 1894-78, modified as follows: The film to film area of contact is 2 inches by 1 inch, instead of 2½ inches by 2½ inches. The mass of the sled is 100 grams rather than 200 grams and the sled speed is 6 inches per minute, the same as ASTM D 1894-78. Thus, the modified test is run at the condition of 50 grams/inches$^2$ rather than 32 grams/inches$^2$. The following Table illustrates by way of comparison with the dramatic reduction in COF of films with the novel skin blend.

TABLE

| Surface Layer | Skin/Skin COF |
|---|---|
| 100% polypropylene/0% | 0.64 |
| 96% polypropylene/4% LLDPE-C$_8$ | 0.34 |
| 94% polypropylene/6% LLDPE-C$_8$ | 0.32 |
| 92% polypropylene/8% LLDPE-C$_8$ | 0.28 |
| 85% polypropylene/15% LLDPE-C$_8$ | 0.26 |
| 67% polypropylene/33% LLDPE-C$_8$ | 0.27 |
| 33% polypropylene/67% LLDPE-C$_8$ | 0.38 |
| 2% polypropylene/98% LLDPE-C$_8$ | >1.0 |
| 0% polypropylene/100% LLDPE-C$_8$ | >1.0 |

As indicated above these films have no COF or slip agents added thereto. It is to be understood, however, that the films may contain conventional additives, including COF or slip agents to further enhance the COF or slip characteristics.

What is claimed is:

1. An oriented film structure comprising a polypropylene film having on at least one surface thereof a layer of a blend of (I) a linear low density copolymer of ethylene with a minor proportion of a C$_3$–C$_{10}$ alpha olefin and (II) polypropylene wherein said blend layer has a lower coefficient of friction than said polypropylene film.

2. The structure of claim 1 wherein said blend contains from about 2–90 wt. % of said copolymer.

3. The structure of claim 2 wherein said blend contains from about 4–70 wt. % of said copolymer.

4. The structure of claim 2 wherein said minor proportion of alpha olefin constitutes from about 2–8 wt. % of said copolymer.

5. The structure of claim 3 wherein said minor proportion constitutes from about 2.5–5 wt. % of said copolymer.

6. The structure of claim 1 wherein said layer is on one surface of said polypropylene film.

7. The structure of claim 1 wherein said layer is on both surfaces of said polypropylene film.

8. A method for making an oriented film structure comprising: applying to at least one surface of a polypropylene film a layer of a blend of (I) a linear low density copolymer of ethylene with a minor proportion of a C$_3$–C$_{10}$ alpha olefin and (II) polypropylene, bringing the combination to a stretch-orientable condition and stretching it in at least one direction.

9. The method of claim 8 wherein the blend layer is applied to the polypropylene film during coextrusion through a die followed by cooling prior to biaxial orientation.

* * * * *